(12) United States Patent
Wade et al.

(10) Patent No.: US 8,090,719 B2
(45) Date of Patent: Jan. 3, 2012

(54) ADAPTIVE PAGE LAYOUT UTILIZING BLOCK-LEVEL ELEMENTS

(75) Inventors: Geraldine G. Wade, Redmond, WA (US); Charles E. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/888,159

(22) Filed: Sep. 22, 2010

(65) Prior Publication Data
US 2011/0010661 A1  Jan. 13, 2011

Related U.S. Application Data

(62) Division of application No. 11/966,405, filed on Dec. 28, 2007, now Pat. No. 7,831,579.

(51) Int. Cl.
*G06F 17/00* (2006.01)
(52) U.S. Cl. ........ 707/736; 707/706; 707/711; 707/755; 707/758; 707/769
(58) Field of Classification Search .................. 707/706, 707/711, 736, 755, 758, 769
See application file for complete search history.

(56) References Cited

U.S. PATENT DOCUMENTS

| | | | |
|---|---|---|---|
| 2005/0177805 A1* | 8/2005 | Lynch et al. | 715/968 |
| 2007/0143307 A1* | 6/2007 | Bowers et al. | 707/10 |
| 2008/0141126 A1* | 6/2008 | Johnson et al. | 715/273 |

* cited by examiner

*Primary Examiner* — Sana Al Hashemi
(74) *Attorney, Agent, or Firm* — Shook Hardy & Bacon LLP

(57) ABSTRACT

Computer-storage media, computerized methods and systems for formatting a page layout according to form factors of a display area are provided. Initially, search results are received and dynamically converted into respective block-level elements, where each of the block-level elements is associated with a portion of content from one of the received search results. Form factors are retrieved from a graphical user interface. Typically the form factors are associated with properties of a display area initiated to present the search results. At least one adaptive template is selected according to the retrieved form factors. The portion of content of each of the block-level elements is formatted based on at least one adaptive template. Also, the adaptive template is utilized to establish content panes within the page layout, as directed by the form factors. These content panes are populated with one or more of the block-level elements.

6 Claims, 12 Drawing Sheets

ADAPTIVE PAGE LAYOUT UTILIZING
BLOCK-LEVEL ELEMENTS

CROSS-REFERENCE TO RELATED
APPLICATIONS

This application is a divisional of U.S. application Ser. No. 11/966,405 filed Dec. 28, 2007, now pending, entitled "ADAPTIVE PAGE LAYOUT UTILIZING BLOCK-LEVEL ELEMENTS," herein incorporated by reference.

STATEMENT REGARDING FEDERALLY
SPONSORED RESEARCH OR DEVELOPMENT

Not applicable.

BACKGROUND

This invention relates to a page layout for search results that is adaptive to attributes of a display area on a graphical user interface (GUI). More particularly, an improved web-browser application that converts search results into block-level elements that are populated into content panes established by an adaptive page layout is provided.

Presently, the Internet provides a vast variety of utilities that assist Internet searching for information. Typically, this information is delivered from a search engine to a web browser located on a user's computing device in subsets that include a standard number of search results therein. For instance, upon submitting a search request, the search engine may return a subset of twenty results, which are presented on a display device with little or no processing by the web browser.

Because these results are not processed at the web browser (e.g., formatted according to the particular display device being utilized by the user), only a small portion of results are initially presented while the balance is clipped from view, thereby requiring a user to scroll to scan all results returned in the subset. In addition, the results are usually listed along one side of a web browser window potentially leaving a large area of the window unused. Accordingly, this inability to provide a scaled view of the search results according to a window size and the inability to take advantage of an entire window area provides the user with an undifferentiated flow of data that is inconvenient to navigate. Further, this inability to perform search-result processing within the web browser limits the functions offered by the web browser that could assist a user in recognizing relevant results and in narrowing the relevant results to a useful form.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for formatting a page layout according to form factors of a display area presented on a graphical user interface (GUI). Initially, search results and form factors are received at a web-browser application. The form factors can include criteria for configuring the page layout of the display area. Typically, a GUI is used within the display area to present the search results. These search results are dynamically converted into respective block-level elements. Each of the block-level elements is associated with a portion of content from one of the received search results. In one embodiment, the portion of content is extracted from a search result by decoupling the content from the original formatting rules that controlled the format of the content. At least one adaptive template is selected according to the criteria within the retrieved form factors. The adaptive template specifies presentation attributes that automatically structure a page payout. Typically, the adaptive template dictates which style sheet to apply, where the style sheet formats the portion of content of each block-level element by adjusting the visual styling of the content (e.g., font color, typographic style, and relational positioning of text).

In addition, the selected adaptive template(s) establish one or more content panes within the page layout. These content panes are populated with one or more of the block-level elements. In this way, the page layout is adapted to the size of the display area, and thus, the search results are arranged resourcefully within the available space. The populated block-level elements are then rendered within the display area. During rendering each block-level element may be associated with a selection area. User-initiated selections of the block-level elements are recognized upon a user marking the selection area associated with the selected block-level elements. These selected block-level elements may be aggregated and temporarily stored such that the aggregation is accessible immediately or at a future time.

BRIEF DESCRIPTION OF THE DRAWINGS

The present invention is described in detail below with reference to the attached drawing figures, wherein.

DETAILED DESCRIPTION

Figure 1:
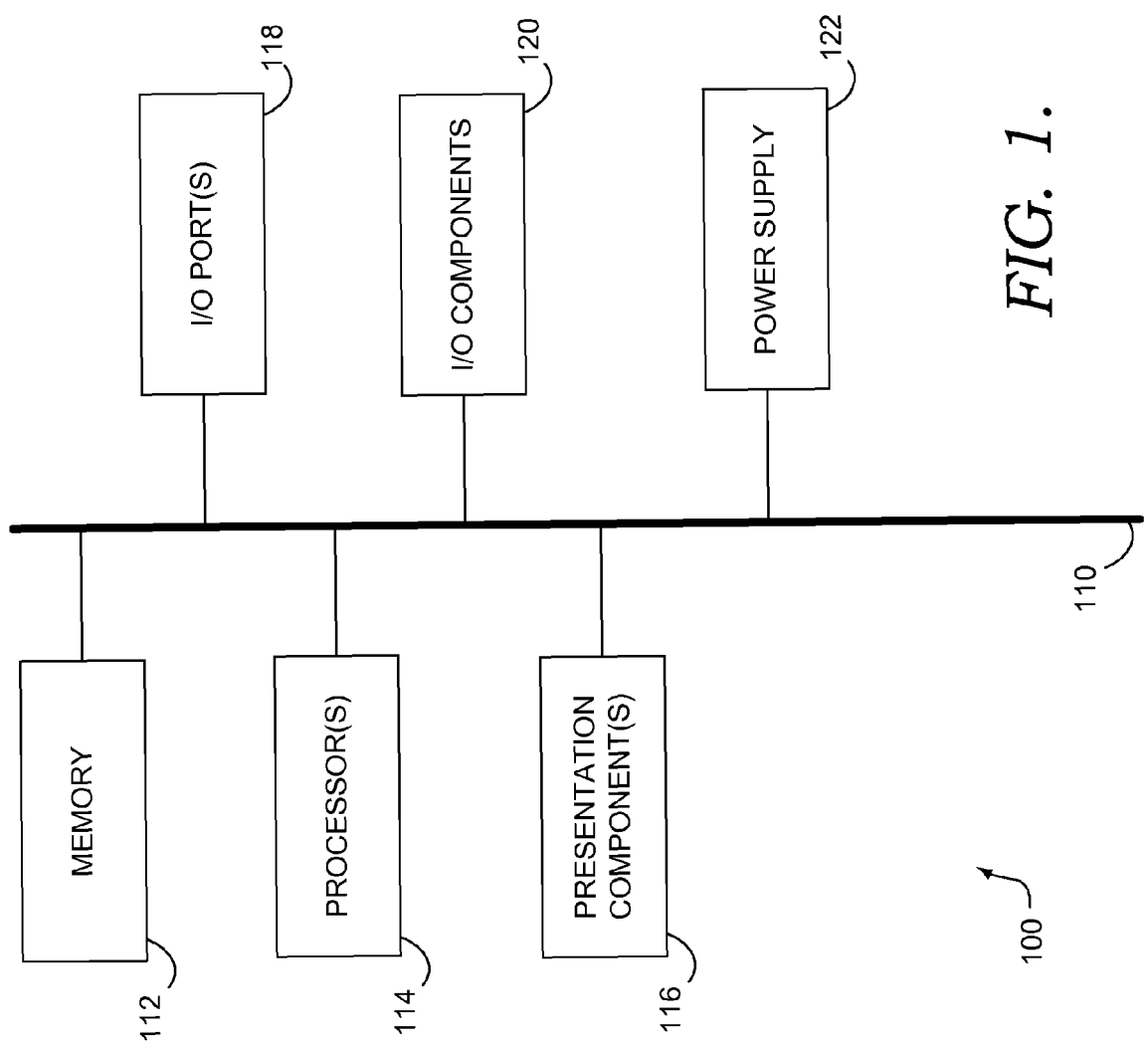
FIG. 1 is a block diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods and systems, and computer-storage media having computer-executable instructions embodied thereon, for formatting a page layout according to form factors of a display area presented a graphical user interface (GUI). Initially, search results and form factors are received, wherein the form factors include criteria for configuring the page layout of the display area. Typically, a display area is initiated on the GUI to present the search results. These search results are dynamically converting into respective block-level elements, wherein each of the block-level elements is associated with a portion of content from one of the received search results. In one embodiment, the portion of content is extracted from a search result by decoupling the content from the original formatting rules that controlled the format of the content. At least one adaptive template is selected according to the criteria within the retrieved form factors. The adaptive template specifies presentation attributes that automatically structure a page payout. In one embodiment, the adaptive template dictates which style sheet to apply, where the style sheet is configured to format the portion of content of each block-level element by adjusting the visual styling of the content (e.g., font color, typographic style, and relational positioning of text). In addition, the selected adaptive template(s) establish one or more content panes within the page layout. These content panes are populated with one or more of the block-level elements. In this way, the page layout is adapted to the size of the display area, and thus, the search results are arranged resourcefully within the available space.

Accordingly, in one aspect, the present invention provides one or more computer-storage media having computer-executable instructions embodied thereon that, when executed, perform a method for formatting a page layout according to form factors of a display area on a graphical user interface. Initially, the method includes receiving search results according to a query provided to a web-browser application. Form factors are retrieved, such as a size of the display area initiated on the GUI to present the search results. The search results are dynamically converted into respective block-level elements, where each of the block-level elements is associated with a portion of content from one of the received search results. At least one adaptive template is selected according to the retrieved form factors. An application procedure is executed to apply at least one adaptive template to prepare the page layout. The application procedure generally includes automatically formatting the portion of content of each of the block-level elements based on presentation attributes specified by the adaptive template, and establishing one or more content panes within the page layout. The content panes are populated with one or more of the block-level elements. The populated block-level elements are rendered within the display area initiated on the GUI. As such, the formatted portion of content is presented according to the presentation attributes of the selected adaptive template.

In another aspect, a computer system is provided for formatting a page layout according to form factors of a display area on a graphical user interface (GUI). The computer system includes a search-engine interface component, an element-generation component, a selection component, a configuration component, a population component, and a presentation component. The search-engine interface component is configured to receive search results and form factors, including criteria for configuring a page layout of a display area. The element-generation component is configured to dynamically converted the search results into respective block-level elements associated with a portion of content from one of the received search results. The selection component is configured to select at least one adaptive template according to the retrieved form factors. The configuration component automatically formats the portion of content of each of the block-level elements based on the adaptive template. In addition, the configuration component utilizes the adaptive template to establish one or more content panes within the page layout. The population component populates the content panes with the block-level elements. The presentation component renders the populated block-level elements within the display area initiated on the GUI presented on a display device.

Generally, the computer system adaptively formats a page layout to present search results utilizing block-level elements. As used herein, the phrase "block-level elements" is not meant to be limiting and may encompass any element that includes content or text in a computer-readable media form (e.g., hypertext markup language). In one instance, the block-level elements are structured to hold portions of content extracted from search results. In another instance, the block-level elements are configured to include data from a data base that operable coupled to a website being accessed (e.g., displaying products in an organize form at a home-shopping website). In yet another instance, the block-level elements are adapted to retrieve and present files information, or folder information, from a hard drive and present that information on a local computing device (e.g., presenting items from a user's music library). Still further, the block-level elements are designed to pull content from a variety of different sources such that it are accessible at a particular Web address (e.g., arranging blog entries on a single user interface). As such, it should be understood and appreciated that the block-level elements may be used to hold and arrange any type of content that can be divided into separate components/elements.

In an exemplary embodiment, these block-level elements, such as hypertext markup language division (HTML DIV) elements, are designed to store content substantially isolated from any formatting rules imposed by an original document from which the content was extracted. In another instance, the block-level elements are configured to include formatting. More specifically, the block-level elements may be configured to store and/or express both content and any presentation attributes (e.g., specified by a adaptive template) that control the display characteristics of the content.

The block-level elements are typically hierarchically arranged (e.g., according to an ordering) as independent "blocks." When presented on a display area, or when populated on a page layout, each block-level element is separated from other block-level elements by a vertical space (e.g., margins). Accordingly, the block-level nature of the block-level elements facilitates separating its enclosed content from the rest of the content on the page layout.

The content of the block-level elements may be formatted by one or more adaptive templates. The adaptive templates dictate which style sheets to utilize when formatting lower-level stylistic properties of the content within the block-level elements. "Style sheets" may be applied to the raw content of the block-level element, and/or previously formatted content, to govern the visual styling of the content (e.g., font color, typographic style, relational positioning of text, and the like). Although one embodiment is discussed above, the style sheets may include any set of heuristics (e.g., rules or logic) that affects characteristics and/or display attributes of content, text, highlighting, or any other features that may be incorporated into a page layout. By way of example only, the style sheet may be a cascading style sheet (CSS).

Similarly, the adaptive templates may affect display attributes of the content. By way of example, the adaptive templates may affect the presentation of the display area by adjusting the coloring of a block-level element based on screen position of the cursor. That is, this feature enables visually differentiating between a block-level element that is selected (e.g., a cursor tool hovering within a boundary region associated with the selected block-level element) and other displayed block-level elements. Accordingly, the selected block-level element may be highlighted while others are not. In addition, other features on the page layout that are associated with the selected block-level element may be highlighted, such as a content pane in which the selected block-level element resides.

In embodiments, the adaptive template is selected by form factors. As used herein, the phrase "form factors" may encompass a wide scope of criteria or properties derived from any source. In an exemplary embodiment, form factors are retrieved from the display area being used by a graphical user interface (GUI), where a GUI is broadly any type of user interface with a display which facilitates user interaction with a computing device. In one instance, form factors include criteria that facilitate selecting adaptive templates that provide formatting of the page layout. This criteria may be based on attributes of the display area, such as size (e.g., width and height) and/or area within the window. Further, this criteria may be gathered by requesting coordinates of the display area from a web-browser application (e.g., using JAVA script).

As discussed herein, the "adaptive templates" include instructions on how to format a page layout, among other things. In an exemplary embodiment, the adaptive template establishes one or more content panes on the page layout. Typically, the content panes are configured as placeholders for block-level elements, advertisements, images, search results, or any other content that may be presented on a display device. In one instance, the content panes are column-style rectangles that are adapted to be populated with block-level elements derived from search results.

In other embodiments, the adaptive template performs a layout routine that determines the number, size, and position of the content panes. This layout routine may be performed in a continuous or intervallic manner, or incident to a trigger event, such as user-initiated resizing of the display area. Accordingly, the adaptive templates are able to modify the configuration of the page layout, and consequently the block-level elements therein, according to the display area that is presently displayed. Accordingly, the configuration of the page layout is governed, in part, by rules within the adaptive template. However, the adaptive template, as discussed above, may dictate which style sheet to apply, where application of the style sheet controls lower-level stylistic properties of the content within the block-level elements.

Having briefly described an overview of embodiments of the present invention and some of the elements featured therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
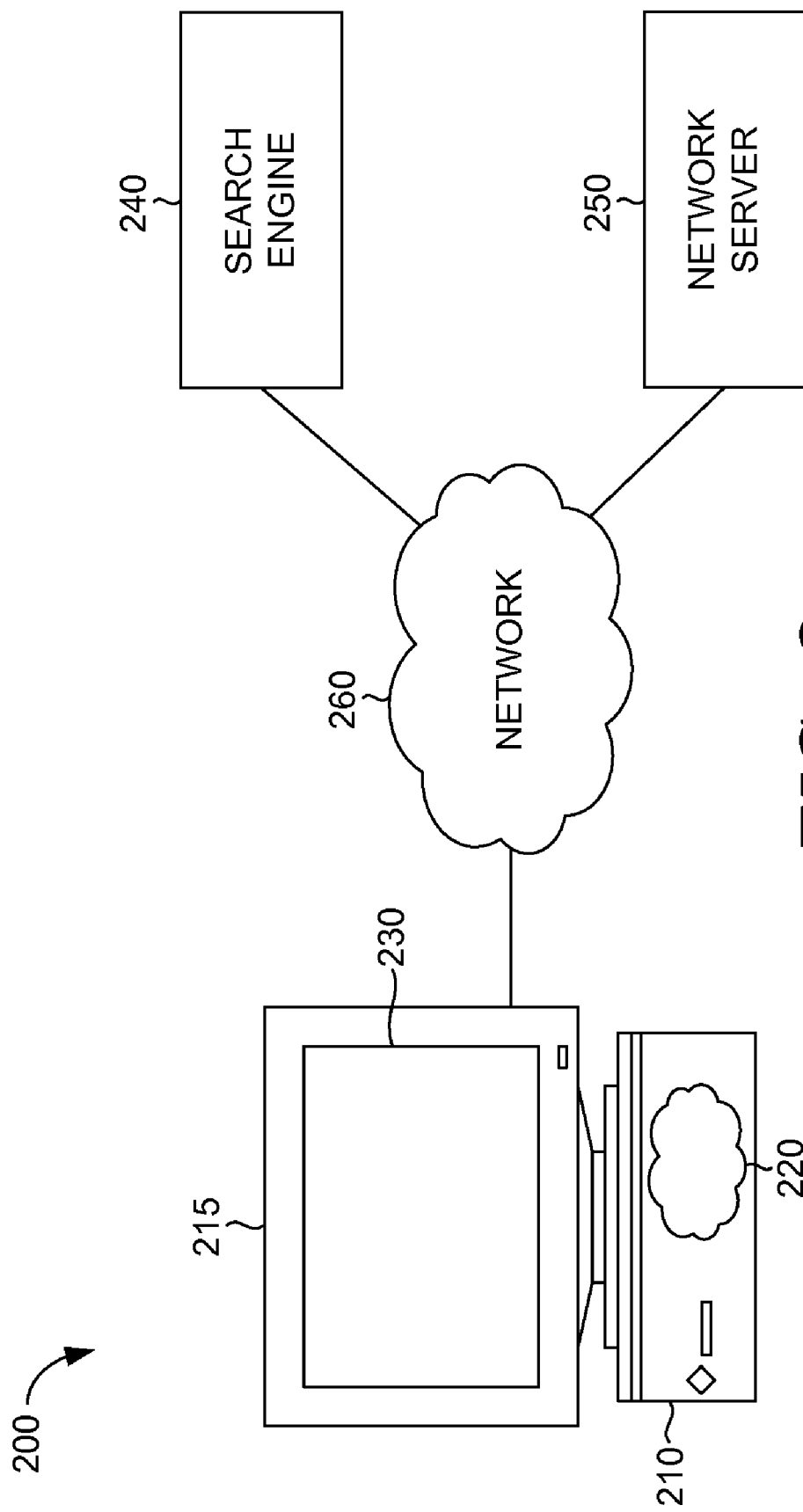
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein. Further, a web-browser application 220 within the exemplary system architecture 200 may be provided as a stand-alone product, as part of a software package, or any combination thereof.

Exemplary system architecture 200 includes a computing device 210 that has a display device 215, a search engine 240, and a network server 250, all in communication with one another via a network 260. Network 260 operably couples components 210, 240, and 250 (wired, wirelessly, or a combination thereof). Also, network 260 may include, without limitation, one or more local area networks (LANs) and/or wide area networks (WANs). Such networking environments are commonplace in offices, enterprise-wide computer networks, intranets, and the Internet. Accordingly, the network 260 is not further described herein.

Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one search engine 240 is shown, many more may be operably coupled to the network 260).

Each of the computing device 210, the search engine 240, and the network server 250, as shown in FIG. 1, may take the form of various types of computing devices. By way of example only, components 210, 240, and 250 may be a personal computing device (e.g., computing device 100 of FIG. 1), handheld device (e.g., personal digital assistant), consumer electronic device, various servers, and the like. Additionally, computing device 210 is configured to present a graphical user interface (GUI) 230 on the display device 215 in one embodiment. The display device 215, operably coupled to the computing device 210, may be configured as any presentation component that may be capable of presenting information to a user, such as a monitor, electronic display panel, touch-screen, and the like. In one exemplary embodiment, the GUI 230 on the display device 215 presents a display area (not shown) initiated by the web-browser application 220 for presenting search results to a user. In another exemplary embodiment, GUI 230 renders block-level elements populated within content pane(s) of a page layout, and renders the content within the block-level elements in a format governed by the adaptive templates, or style sheets that are determined by the adaptive templates, as more fully discussed above.

Input device 225 is provided to receive input(s) affecting, among other things, a presentation of the search results in a display area at the GUI 230. Illustrative devices include a mouse, joystick, key pad, microphone, I/O components 120 of FIG. 1, or any other component capable of receiving a user input and communicating an indication of that input to the computing device 210. By way of example only, the input device 225, controls the location of where a cursor tool hovers on the GUI 230.

In embodiments, the computing device 210 includes a web-browser application 220 that may be manipulated by the operator. Web-browser application 220 is generally configured to access and communicate with the search engine 240 and the network server 250. In one instance, access to the search engine 240 is attained by providing an appropriate uniform resource locator (URL) address to the web-browser application 220 that targets the search engine 240. In another instance, communication may be via an Internet (e.g., the World Wide Web) or an intranet (e.g., internal system to the communications network). Accordingly, the web-browser application 220, as discussed more fully below with reference to FIG. 3, may be configured to convey a query to the search engine 240 and receive search results in return.

Figure 3:
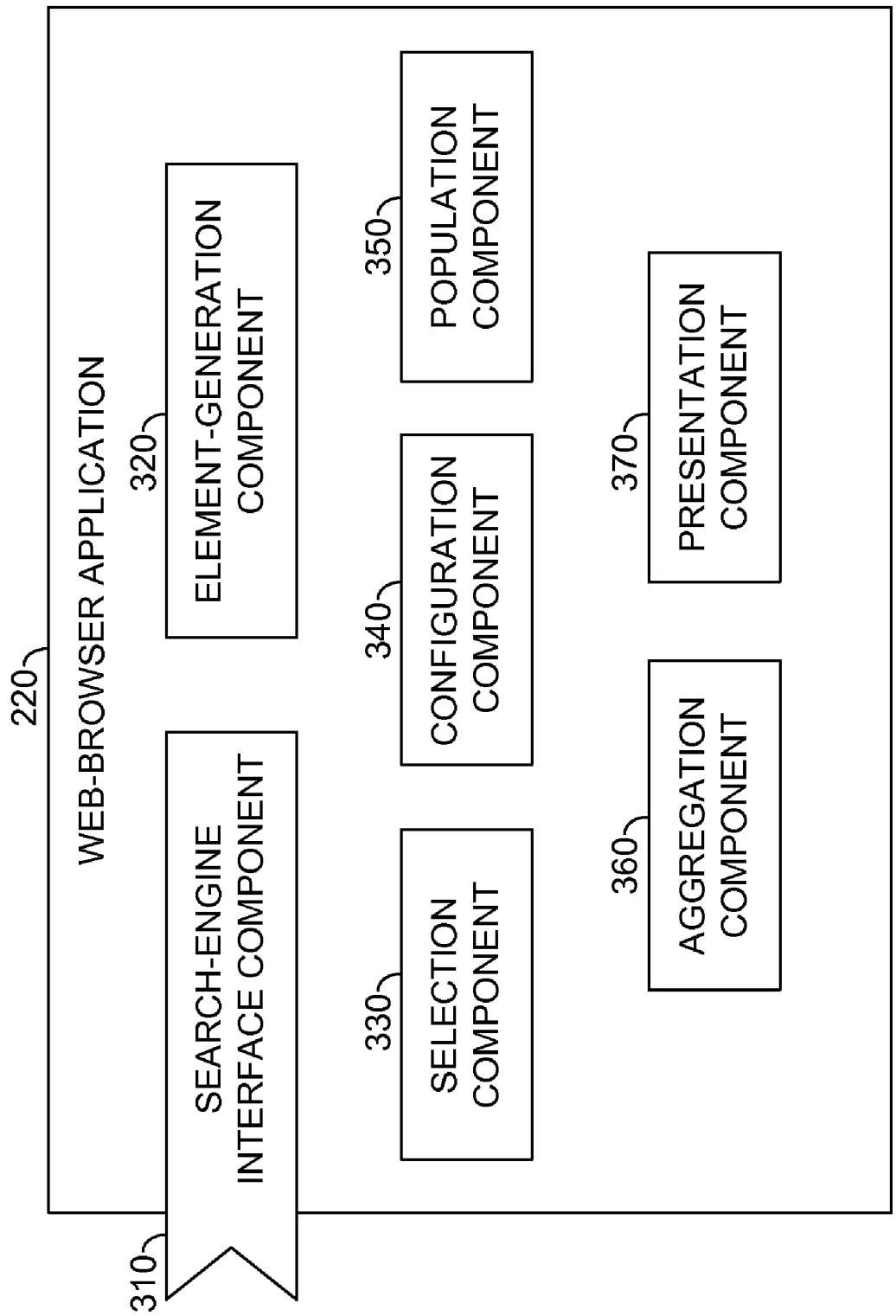
FIG. 3 is a block diagram of an exemplary web-browser application configured to process and arrange search results within a page layout, in accordance with an embodiment of the present invention.

Turning to FIG. 3, the web-browser application 220 will now be discussed. Generally, the web-browser application 220 includes a search-engine component 310, an element-generation component 320, a selection component 330, a configuration component 340, a population component 350, an aggregation component 360, and a presentation component 370. The web-browser application 220 is but one example of a suitable application that may be run on any device, and is not intended to suggest any limitation as to the scope of use or functionality of the invention. Neither should the illustrated web-browser application 220 be interpreted as having any dependency or requirement relating to any one or combination of the components 310, 320, 330, 340, 350, 360, or 370 as illustrated. In some embodiments, one or more of the components 310, 320, 330, 340, 350, 360, and 370 may be implemented as stand-alone applications. In other embodiments, one or more of the components 310, 320, 330, 340, 350, 360, or 370 may be integrated directly into the operating system of the computing device 210, the network server 250, or a combination thereof. By way of example only, the search-engine interface component 310 may be housed in association with the search engine 240 of FIG. 2, while a selection component 330 may reside in the network server 250, and the presentation component 370 is a stand-alone device. It will be understood by those of ordinary skill in the art that the components 310, 320, 330, 340, 350, 360, and 370 illustrated in FIG. 3 are exemplary in nature and in number and should not be construed as limiting. Any number of components may be employed to achieve the desired functionality within the scope of embodiments of the present invention.

In embodiments, the search-engine interface component 310 is configured to receive search results and form factors. The search results are typically received from the search engine 240 of FIG. 2 in response to a query supplied from the web-browser application 220. In addition, a display area initiated on a GUI (e.g., GUI 230 of FIG. 2) may be configured to present the search results. The form factors may be received from the display device 215 of FIG. 2, as discussed more fully above, and may include criteria for configuring a page layout of the display area.

In embodiments, the element-generation component 320 is configured to dynamically convert the search results into respective block-level elements. In one instance, this conversion includes decoupling a portion of the content within a search result from original formatting rules associated therewith (e.g., established by the source of the content), and extracting the portion of content. In another instance, the conversion includes generating a block-level element for each portion of content extracted from the search results. By way of example, the element-generation component 320 converts a search result textual description, title, and URL address from extensible markup language (XML) to HTML or JAVA script, thereby providing the ability to store each search result as an individually modifiable element.

Typically, dynamic conversion is triggered by a callback routine that instructs the web-browser application 220 to gather search results and provide them to the element-generation component 320. Further, the process of dynamic conversion may be conducted asynchronously of other processes running within the web-browser application 220. For instance, one or more search results may be dynamically converted and stored to a data structure without influencing other processes, such as the process of populating content panes, as discussed below. In embodiments, the element-generation component 320 is adapted to keep a buffer number of converted search results in storage, ahead of a user demand, independent of the population process.

In embodiments, the selection component 330 is configured to select at least one adaptive template according to the criteria within the retrieved form factors. The form factors, as discussed more fully above, are provided to web-browser application 220 from the GUI 230 of FIG. 2. The criteria conveyed in the form factors may relate to a range of features being presented to a user including, but not limited to, the following: properties of the display area, type of display device, and quality of resolution.

The adaptive templates may be selected from a database, data store, or server (e.g., network server 250 of FIG. 2). In one instance, selection includes comparing the criteria against rules within the adaptive templates to determine which adaptive templates are associated with the form factors. Upon selection, the adaptive templates specify a scheme to determine which rules of formatting apply to the block-level elements, as discussed more fully above.

In embodiments, the configuration component 340 is configured to automatically format the block-level elements based on at least one adaptive template. As more fully discussed above, rules within the adaptive templates govern the presentation attributes of the content. For instance, the rules of an adaptive template may adjust the number of lines of a descriptive text in block-level element if a form factor indicates that the size of the display area is reduced. However, the rules may also dictate that the presentation attributes for a given portion of content may change based on particular circumstances. For instance, the content may be naturally shaded or cast in gray tones. But, when selected by a cursor tool, the content may be highlighted in colors or include black and white features. In other embodiments, the selected adaptive templates dictate identify a style sheet to manage the stylistic properties and/or presentation attributes of the portion of content within the block-level elements.

In embodiments, the configuration component 340 is further configured to establish one or more content panes within the page layout according to the adaptive layout. In one instance, the adaptive template, as selected according to the form factors of the display area, will add, remove, or adjust the content panes based on the width and height of a display area. By way of example, if the width of the display area is collapsed below a certain threshold, the number of column-style content panes may decrease from three to two, or from two to one. In another example, if the height of the display area is collapsed below a certain threshold, a content pane configured to accept advertisements or images may be withdrawn from the page layout.

In embodiments, the population component 350 is configured to populate the one or more content panes with one or more of the block-level elements. Typically, upon generating the block-level elements, these elements are stored in an ordering at a data structure. The ordering may be based on user-generated settings, relevance of the search result associated with the block-level element to the query, date, or any other method for ordering known to those of skill in the relevant field. In one embodiment, the content panes are populated with a set of block-level elements grouped together within the ordering. In another embodiment, populating the content panes is a recursive process that includes arranging the block-level elements into the content panes one after another based on the previously established ordering (e.g., utilizing a recursive layout algorithm).

In tandem, the configuration component 340 and the population component 350 provide for adaptive pagination that reacts to an available height and/or width of a display area. Adaptive pagination solves the issue of importing more content than a display area can hold (e.g., forcing the user to scroll to view the rendered content) by formatting according to the form factors. Further, this adaptive formatting allows dynamic formatting of a page layout "on the fly," where the configuration and number of content panes and block-level elements varies as parameters of the display area change.

In embodiments, the aggregation component 360 is configured to recognize user-initiated selections of the block-level elements. In one instance, selecting includes marking a selection area associated with the selected block-level elements. This selection area may be a check box, as discussed more fully with reference to FIG. 9. Alternatively, the selection area may be any method or mechanism known by those of skill in the relevant field for providing a user or a computing device the capability to mark a portion of content as selected.

In an exemplary embodiment, the selected block-level elements are aggregated. These selected block-level elements may be at least temporarily stored in a collection consistent with the aggregation. In one instance, the collection is temporarily stored on a new web page incident to a receiving an indication from a user to aggregate. In another instance, the collection is temporarily stored at a website that is accessible by a uniform resource locator (URL) address that targets the website.

In embodiments, the presentation component 370 is configured to render the populated block-level elements within the display area initiated on the GUI 230 presented on a display device (e.g., display device 215). In particular, the presentation component 370 may present a portion of content within one or more of the block-level elements in accordance with the presentation attributes of a selected adaptive template.

Returning to FIG. 2, the search engine 240 is configured to receive a query from the computing device 210. In addition, the search engine 240 is configured to perform a primary search that returns a specific number of results. The specific number may be determined by the user or may be a default setting of the web-browser application 220. Upon consuming the specific number of search results at the web-browser application 220, more results may be required as indicated by the callback routine.

In an exemplary embodiment, the search engine 240 is adapted to support predictive gathering of search results. Typically, predictive gathering includes establishing a predetermined number of non-inserted block-level elements that are maintained in the data structure. The predetermined number may be based on a predicted average number of block-level elements that may be presented within the present display area. In operation, if the predicted number is reached, a callback routine is triggered thereby gathering an additional group of search results and dynamically converting the gathered search results to block-level elements. As discussed above, these procedures may be conducted asynchronously of populating the content pane(s).

The network server 250 is configured to store information that is searchable upon a user request. In embodiments, such information may include, without limitation, adaptive templates, style sheets, search results, aggregated block-level elements based on a selection, and the like. It will be understood and appreciated by those of ordinary skill in the art that the information stored in the network server 250 may be configurable, and may store any information or any other data that may support the operation of the present invention. The content and volume of such information are not intended to limit the scope of embodiments of the present invention in any way.

Figure 4:
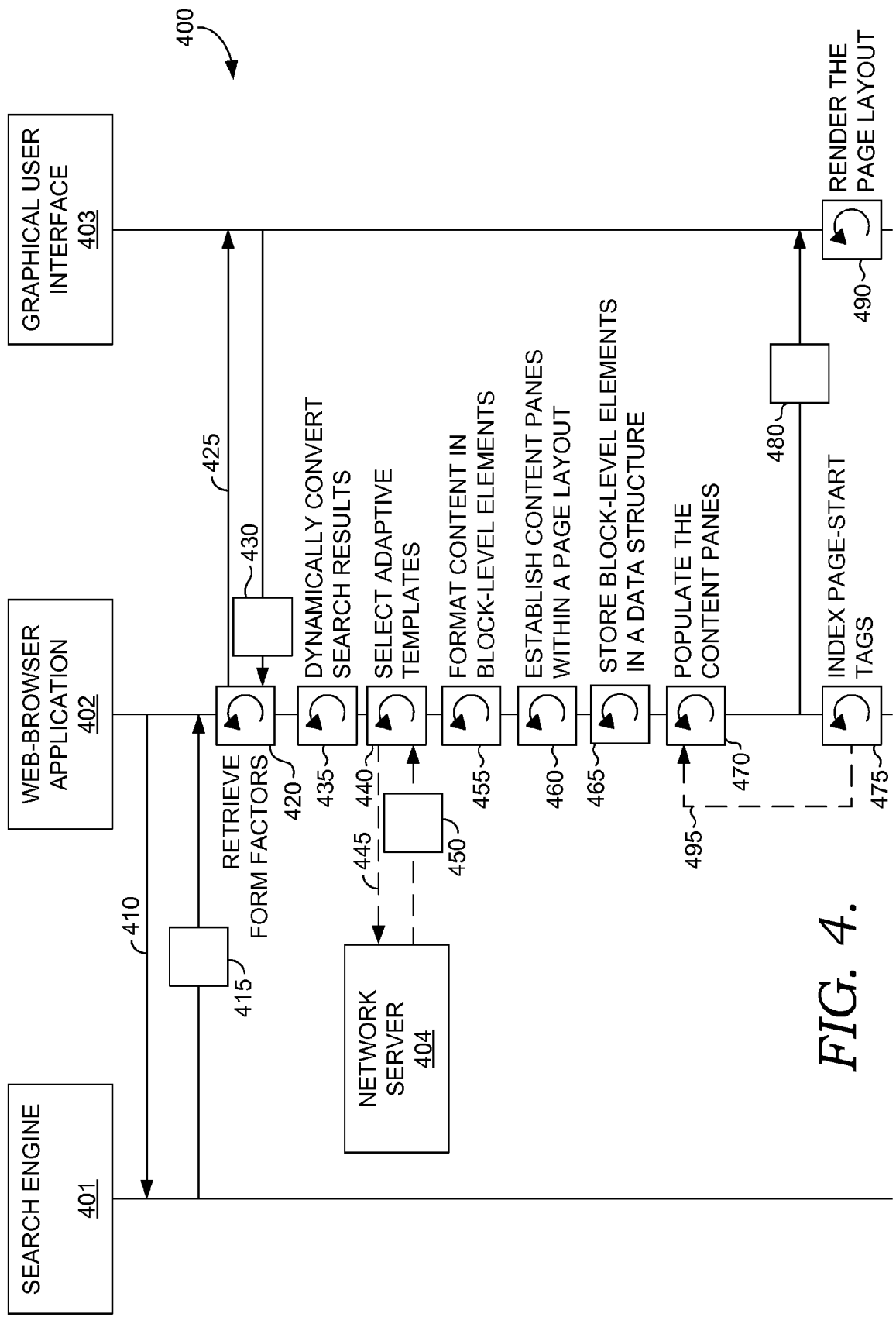
FIG. 4 is a diagrammatic chart showing a method for formatting a page layout at a web-browser application, in accordance with an embodiment of the present invention.

The general functionality of an implementation of the present invention will now be discussed with reference to FIG. 4, wherein a diagrammatic chart showing a method 400 for formatting a page layout at a web-browser application, in accordance with an embodiment of the present invention, is shown. Initially, a request 410 is provided from the web-browser application 402 (e.g., web-browser application 220 of FIGS. 2 and 3). A search engine 401 (e.g., search engine 240 of FIG. 2) receives the query 410 and gathers search results 415 based thereon. The search results 415 are provided to the web-browser application 402.

Prior to, or incident to, receiving the search results 415, the web-browser application 402 performs a procedure 420 for retrieving form factors 430. A request 425 is provided to a graphical user interface (GUI) 403 (e.g., GUI 230 of FIG. 2). Based on attributes of the display area initiated on the GUI 403 to present the search results 415, the form factors 430 are generated and returned to web-browser application 402.

Search results 415 are dynamically converted to block-level elements at procedure 435. As discussed above, the block-level elements include content extracted from the search results with prior formatting rules substantially removed. At procedure 440, the adaptive templates 450 are selected. In particular, selection data 445 derived from the form factors 430 is provided to a network server 404 (e.g., network server 250 of FIG. 2). The network server 404 responds to the request from the web-browser application 402 with appropriate adaptive templates 450 that have rules corresponding to the selection data 445. Although selection from a storage location on the network server is discussed, the adaptive templates 450 may be stored in any accessible location. Additionally, the present invention contemplates the adaptive templates 450 being generated by, or implicit within, a the web-browser application 402.

An application process is performed that applies the rules of the adaptive templates 450 to the block-level elements and an adaptive template, thereby preparing a format of the page layout. The application process includes procedure 455 that formats content in the block-level elements. Typically, formatting is based on presentation attributes within one or more rules of the adaptive templates 450; however, formatting may be based on style sheets identified by the selected adaptive templates 450. The application process also includes procedure 460 that establishes one or more content panes within the page layout according to the rules of the adaptive templates 450 in conjunction with the form factors 430.

The block-level elements are stored in an ordering at a data structure, as indicated at procedure 465 executed on the web-browser application 402. As indicated at procedure 470, the content panes established by the adaptive templates are populated with block-level elements. As discussed above, populating is based on the ordering of the block-level elements. Further, populating continues until an overflow condition is reached, where a block-level element extends beyond a content pane and no other content panes are available for population.

The page layout 480 is provided for presentation in the display area of the GUI 403. As indicated at procedure 490, the page layout 480 is rendered. If, incident to rendering, a user begins scrolling through page layouts 480, page-start tags may be determined and indexed in a page-start list associated with the page layout 480. The indexed page-start list may be accessed when populating the content panes, as indicated by loop 495. Accordingly, the indexed page-start tags may assist in determining which block-level element to first arrange in a content pane upon recognizing an upward scroll command (e.g., "next page" event). In addition, the last block-level element that is populated on the page layout 480 may be used to determine the first block-level element to select from the data structure when populating content panes of a subsequent page layout upon recognizing a downward scroll command (e.g., "previous page" event).

Figure 5:
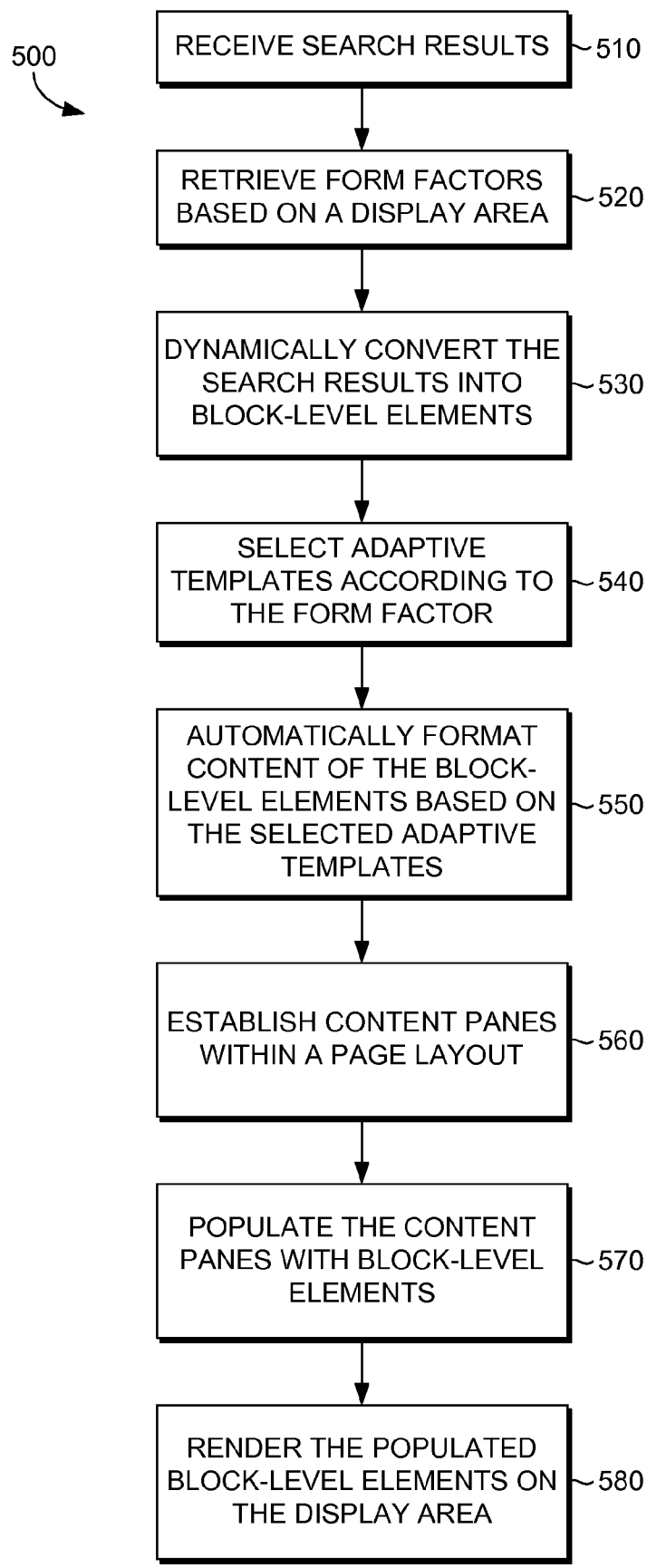
FIG. 5 is a flow diagram illustrating an overall method for formatting a page layout according to form factors of a display area, in accordance with an embodiment of the present invention.

With reference to FIG. 5, a flow diagram illustrating an overall method 500 for formatting a page layout according to form factors of a display area is shown, in accordance with an embodiment of the present invention. Initially, as indicated at block 510, the search results are received in response to a query, typically provided to a search engine. As indicated at block 520, form factors are retrieved from a GUI, where the form factors may be based on a display area, or characteristics thereof. The search results are dynamically converted into block-level elements, as indicated at block 530. The adaptive templates are selected according to the retrieved form factors, as indicated at block 540. As indicated at block 550, content of the block-level elements, derived from the search results, is automatically formatted in accordance with rules within the selected adaptive templates. As indicated at block 560, the adaptive templates establish content panes within the page layout. As indicated at block 570, the established content panes are populated with block-level elements. In an exemplary embodiment, the block-level elements are populated one after another and are drawn from a data structure according to an ordering, as discussed more fully above. The populated block-level elements are rendered at a display area presented on a GUI, as indicated at block 580.

Figure 6:
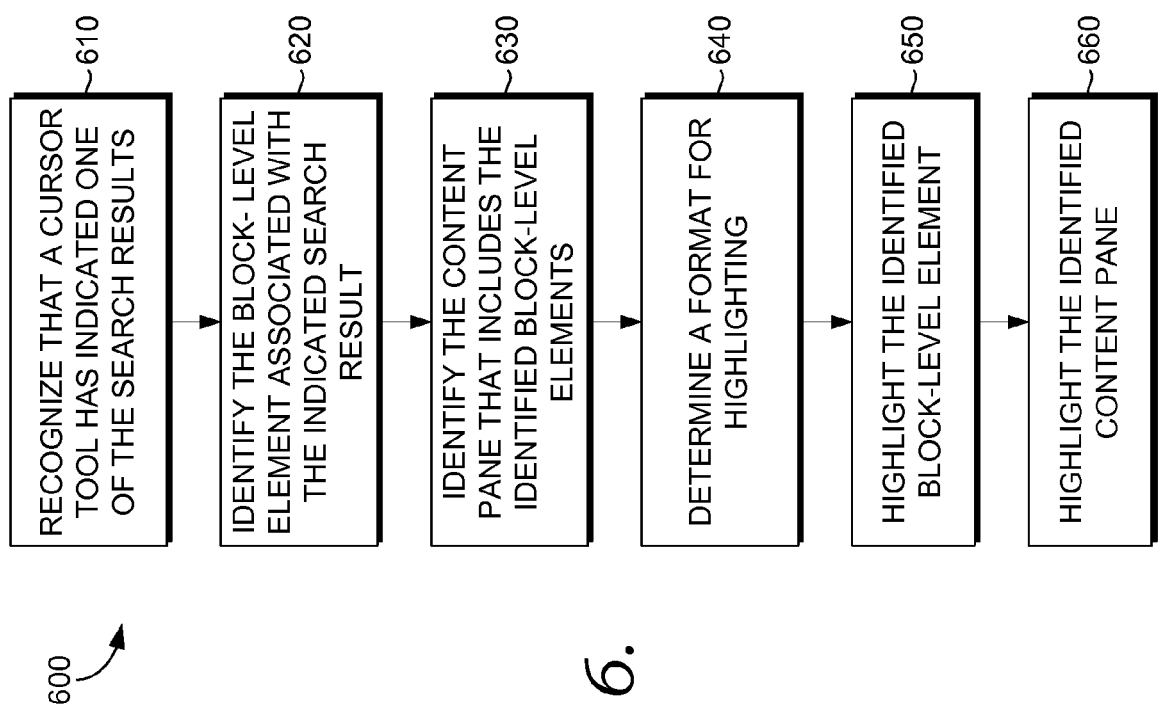
FIG. 6 is a flow diagram illustrating an overall method for focusing a user's attention to one of a plurality of search results presented within a display area on a graphical user interface (GUI), in accordance with an embodiment of the present invention.

Referring to FIG. 6, a flow diagram illustrating an overall method 600 for focusing a user's attention to one of a plurality of search results presented within a display area on a graphical user interface (GUI), in accordance with an embodiment of the present invention, is shown. Initially, a cursor tool is recognized as indicating one of the search results, as indicated at block 610. By way of example, an indication may be a pointer hovering over a block-level element associated with the search result, as actuated by an input device (e.g., input device 225, mouse, and the like). As indicated at block 620, the block-level element associated with the indicated search result is identified. In some embodiments, the content pane in which the identified block-level element resides is identified as well, as indicated at block 630. A format for highlighting, typically based on the adaptive templates or style sheets indicated by the adaptive templates, is determined, as indicated at block 640. The identified block-level element may be highlighted according to the format (see block 650), and, in some embodiments, the identified content pane may be highlighted as well (see block 660).

Figure 7:
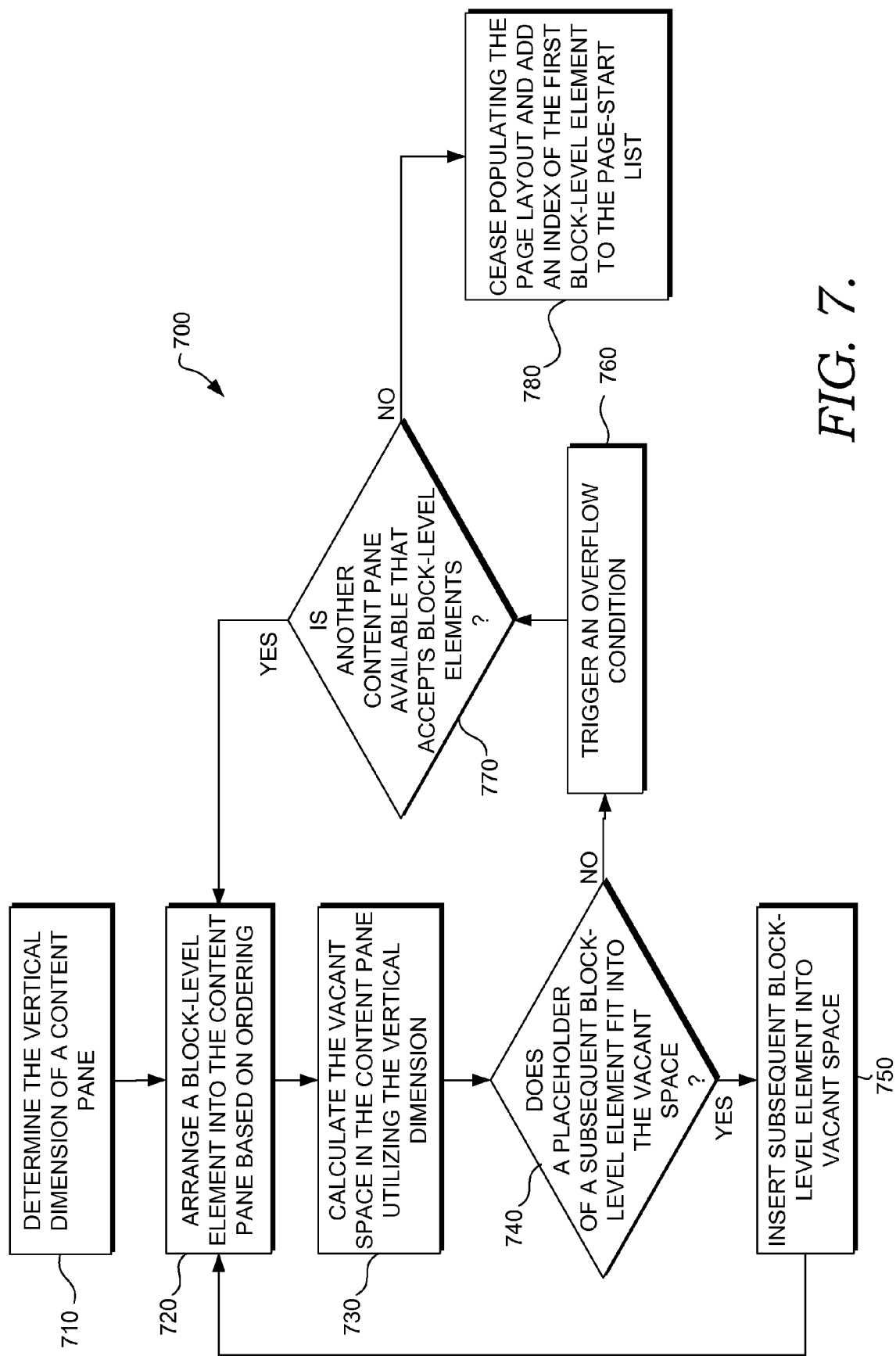
FIG. 7 is a flow diagram illustrating a method for populating one or more content panes with block-level elements, in accordance with an embodiment of the present invention.

Turning to FIG. 7, a flow diagram illustrating a method 700 for populating one or more content panes with block-level elements, in accordance with an embodiment of the present invention, is shown. Initially, a vertical dimension of a content pane is determined, as indicated at block 710. As indicated at block 720, a block-level element is arranged in the content pane as part of the populating process. Incident to arrangement in the content pane, a height of the remaining vacant space is calculated, as indicated at block 730. In one instance, the calculation subtracts the total height of the block-level elements presently arranged in the content pane from the determined vertical dimension of the content pane. As indicated at block 740, a placeholder that represents the dimensions of a subsequent block-level element is inserted at the vacant space. If the placeholder fits into the vacant space, the subsequent block-level element is arranged into the content pane, as indicated at block 750, and the population process is repeated (e.g., performing a looping procedure in a recursive manner).

If the placeholder does not fit into the vacant space, an overflow condition is triggered, as indicated at block 760. The overflow condition usually indicates that a particular content pane is full. As indicated at block 77, a determination of whether another content pane is available (e.g., established by the adaptive format), which accepts block-level elements, is made. If another content pane is established, the population process is repeated for that content pane. Otherwise, as indicated at block 780, the process of populating the page layout ends. The process may be resumed, however, upon a user-initiated command to scroll between pages, to scroll between search results, to resize the display area, etc. In addition, an index of the first block-level element may be added to the page-start list, as more fully discussed above.

Figure 8A:
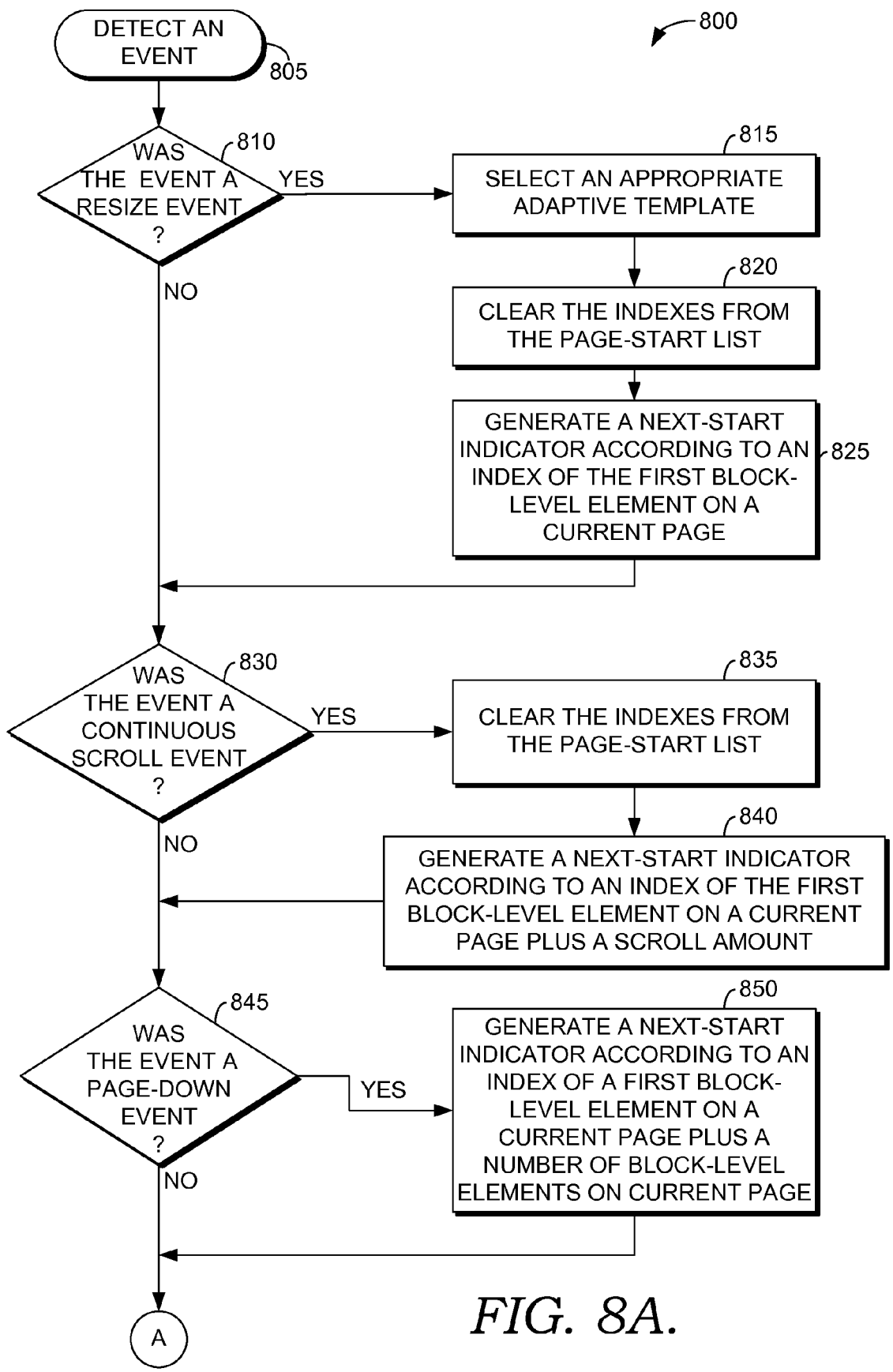
FIGS. 8A and 8B are a flow diagram illustrating a method for indexing a page-start list, in accordance with an embodiment of the present invention.
Figure 8B:
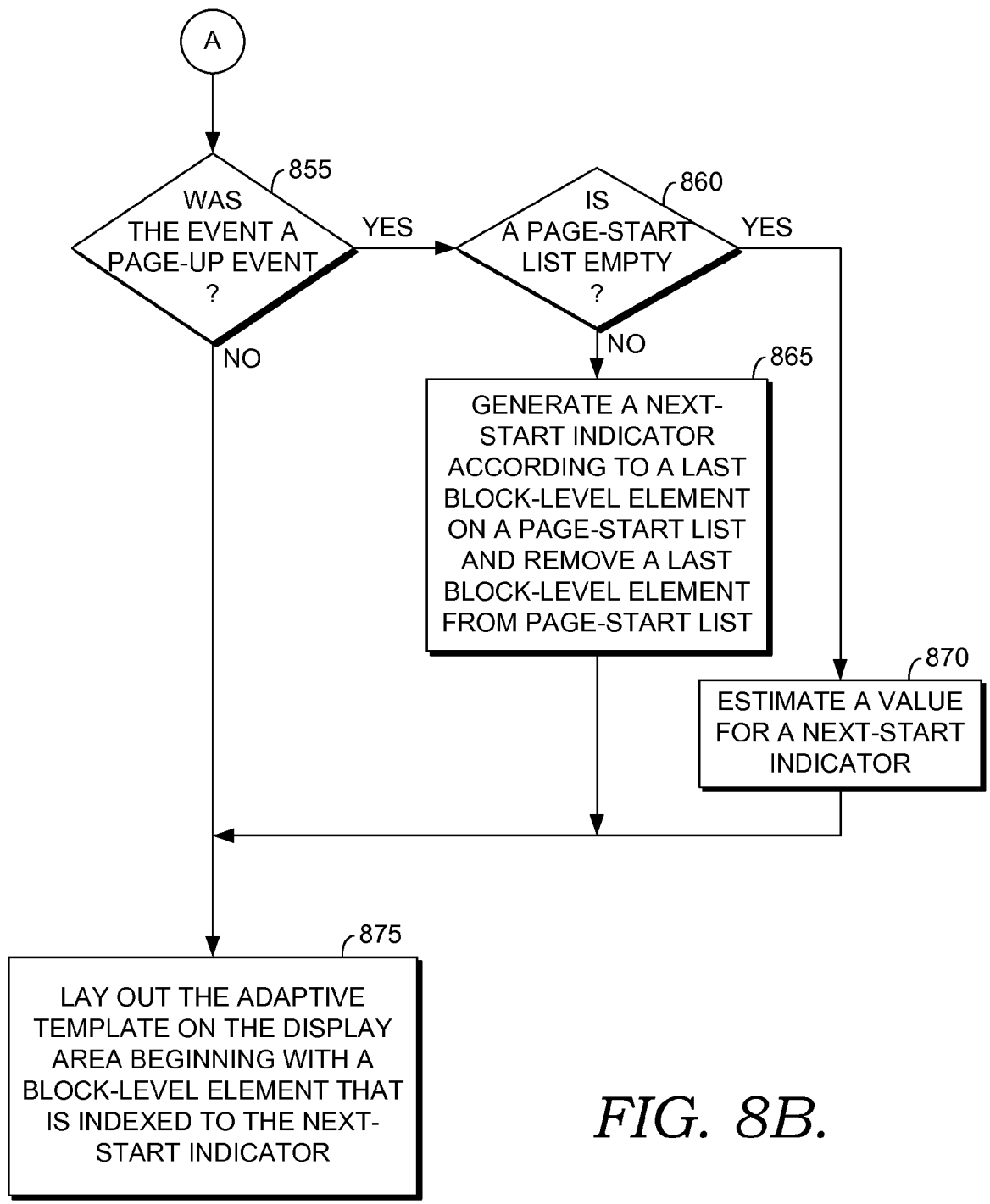

Referring to FIGS. 8A and 8B, a flow diagram illustrating a method 800 for indexing a page-start list, in accordance with an embodiment of the present invention, is shown. Initially, as indicated at block 805, a user event is detected. In embodiments, a user event may be a user-initiated command to scroll up or down, a resize command, a computer-generated action, a remote indication to perform an act, etc. As indicated at block 810, a determination of whether the event was a resize event (e.g., command to resize a display area) is made. If the determination indicates that a resize event is recognized, an appropriate adaptive template is selected (see block 815) and the indexes within the page-start list are cleared (see block 820). In addition, a next-start indicator, or tag, is generated, as indicated at block 825. In one embodiment, the next-start indicator indexes a first block-level element that was populated on the current display area (i.e., within the present adaptive layout prior to resizing). Typically, the index of the next-start indicator is retained in the page-start list.

As indicated at block 830, if the determination that the event was not a resize event, a determination of whether the event was a continuous scroll event is made. If the determination indicates that a continuous scroll event is recognized, the indexes are cleared from the page-start list (see block 835) and a next-start indicator is generated according to an index to the first block-level on a current page plus a scroll amount (see block 840). In embodiments, the scroll amount may be any indication from a user that controls which content is presented in a display area within the scope of the continuous scroll event. However, if the determination indicates that the event was not a continuous scroll event, a determination of whether the event is a page-down event is made, as indicated at block 845. If the determination indicates that the page event is a page-down event, a next-start indictor is generated according to an index to a first block-level element on a current page plus a number of block-level elements on the current page, as indicated at block 850. In embodiments, the number of block level elements may be appraised by the appropriate index on the page-start list.

Referring now to FIG. 8B, as indicated at block 855, if the page-event is not a page-down event, a determination of whether the event is a page-up event is made. If the event is not a page-up event, the adaptive template is constructed on the display area and populated beginning with the block-level element utilizing the index corresponding to the next-start indicator, as indicated at block 875. If, however, the page-event is a page-down event, a determination of whether the page-start list is empty is made, as indicated at block 860. If the determination yields a positive response, a value for a next-start indicator is estimated, as indicated at block 870. In embodiments, the value is derived from multiple factors that include the size of the block-level elements, dimensions and/or types of the panes of the adaptive template, etc. Alternatively, if the determination yields a negative response, a next-start indicator is generated according to a last block-level element on a page-start list, as indicated at block 865. In addition, a last block-level element may be removed from the page-start list. Further, it should be understood that, although the determinations are list serially, they may be accomplished in any order (i.e., performed in an asynchronous manner).

Figure 9:
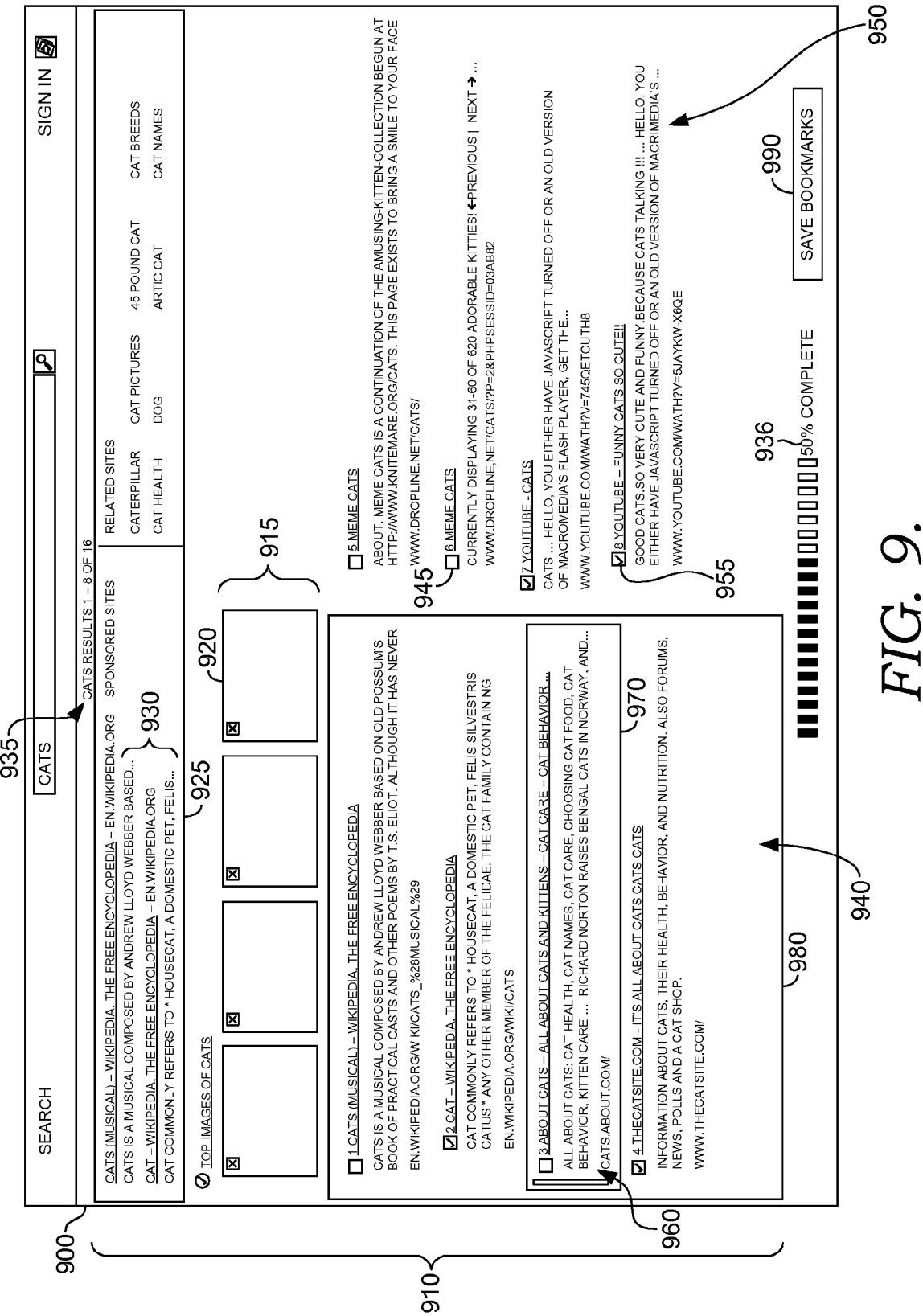
FIGS. 9-11 are screen displays of exemplary display areas that show page layouts populated with block-level elements, in accordance with embodiments of the present invention.

Turning now to FIG. 9, a screen display of an exemplary display area 900 that illustrates a page layout 910 populated with block-level elements is shown, in accordance with embodiments of the present invention. Initially, the page layout is divided into content panes 915, 925, 940, and 950. In this embodiment, because the display area 900 is tall, the page layout 910 can include the content pane 915 configured to accept images 920 and the content pane 925 configured to accept advertisements 930. Additionally, in this embodiment, because the display area 900 is fairly wide, the page layout 910 can accommodate two column-type content panes 940 and 950 that are configured to accept block-level elements. Additionally, a progress bar 936 is provided that reflects the proportion of search results being displayed 935 and shows how far the user has scrolled within the gathered search results. As such, the progress bar 936 provides the user with a spatial sense of place when navigating through the set of search results.

As depicted, block-level element 960 is indicated by user. Methods for indication, such as a mouse-over cursor tool, are discussed more fully above. Accordingly, the indicated block-level element 960 is provided with a highlight 970. The format of the highlight 960 is typically governed by rules within previously selected adaptive templates, or style sheets identified by the selected adaptive templates. Additionally, the content pane 940 in which the indicated block-level element resides may be provided with a highlight 980. Similar to the highlight 970 associated with the indicate block-level element 960, the format of the highlight 980 is governed by the rules within the adaptive templates. Thus, in this instance, the highlighting 970 and 980 provides the user with a way to easily visually differentiate between indicated and non-indicated search results (e.g., block-level element 950), thereby focusing the user's attention to a specific area of the display area 900.

In the embodiment illustrated in FIG. 9, each of the search results are provided with a selection area. As shown, selection area 945 has been marked by a user-initiated selection, while selection area 955 has not. Specifically, in this example, the selection areas depicted are check-box style tools that may be toggled between marked and unmarked. Upon depressing button 990, the selected search results are aggregated and temporarily stored in a location consistent with the aggregation. In one instance, selected search results are moved to a new web page such that the user is only presented with search results that have been selected (e.g., selected search result associated with block-level element 950). In another instance, the aggregated selected search results are available at a website targeted by a URL address.

Figure 10:
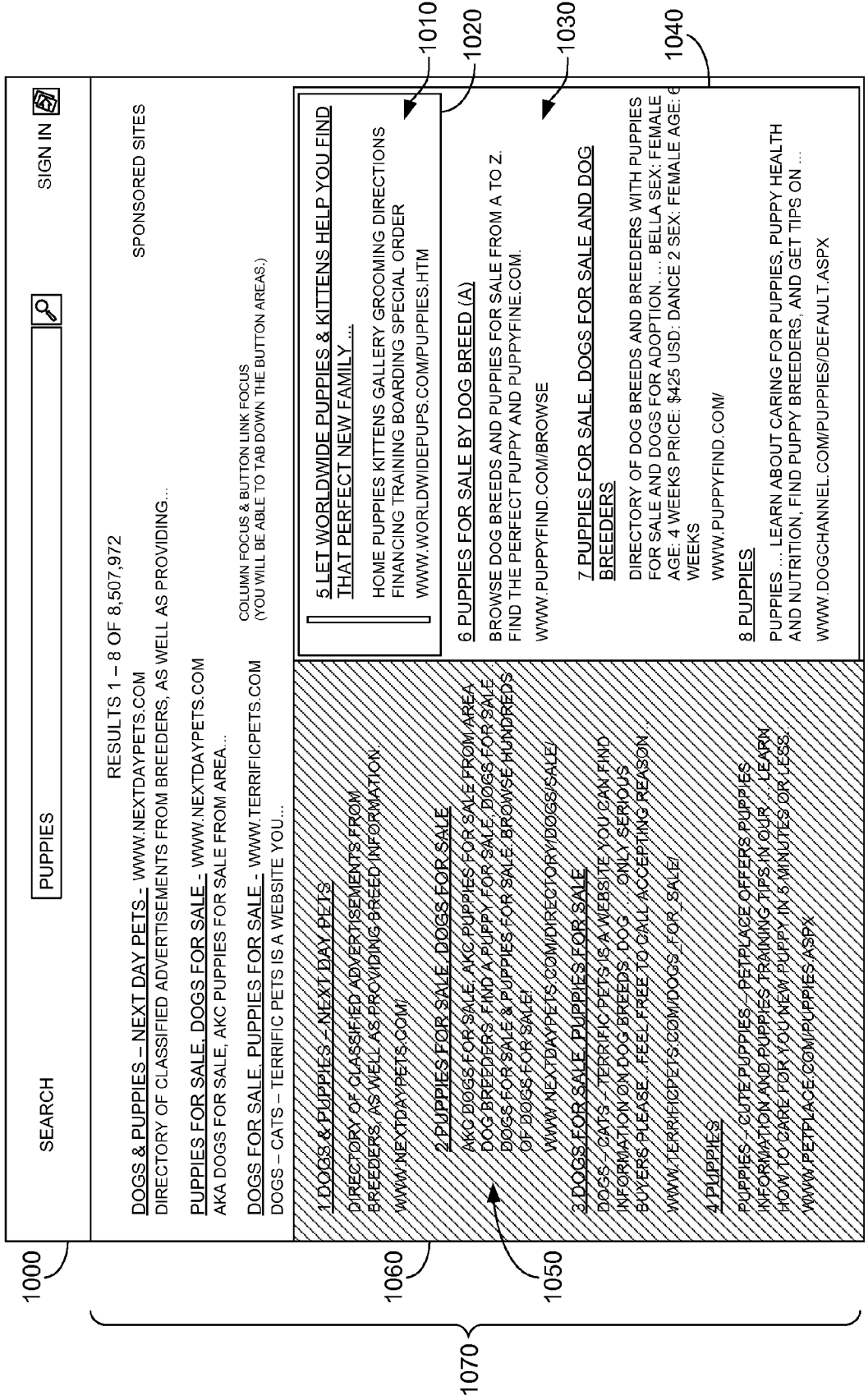

With reference to FIG. 10, a screen display of an exemplary display area 1000 that illustrates a page layout 1070 populated with block-level elements is shown, in accordance with embodiments of the present invention. Initially, a block-level element 1010 is indicated. As discussed above, the indicated block-level element 1010 is provided with highlighting 1020 and the associated content pane 1040 is also provided with highlighting 1030. In this instance, the highlighting changes the format of the content (e.g., utilizing rules in the selected adaptive templates) within the indicated block-level element 1010 and associated content pane 1040 to produce a visual depth perception that quickly draws a user's eye to an area of interest. The default formatting of content, when not indicated by a user, includes darker subtle colors, for instance content pane 1060 and block-level element 1050. This style of formatting recedes the non-indicated features to a background, while highlighting draws attention.

Figure 11:
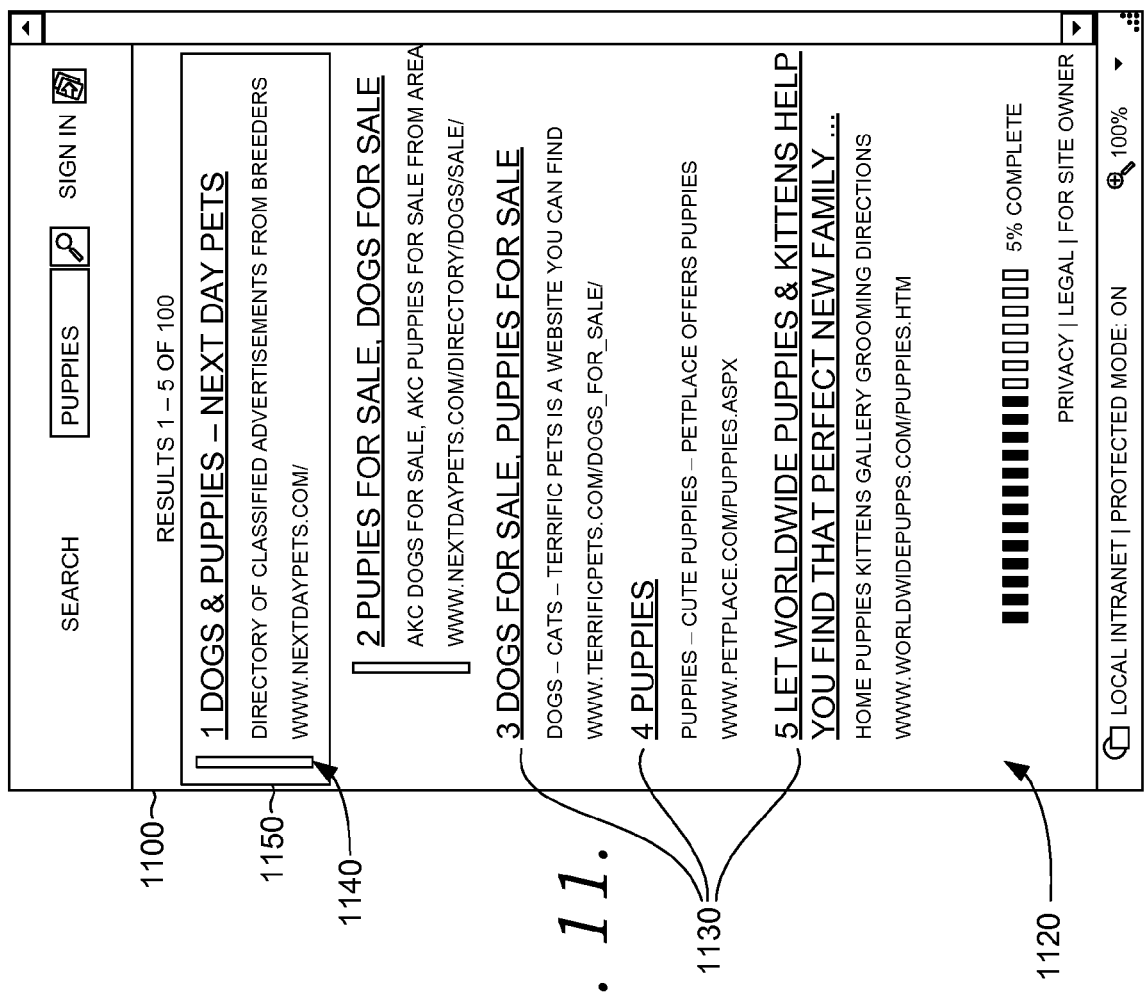

With reference to FIG. 11, a screen display of an exemplary display area 1100 that illustrates a page layout 1160 populated with block-level elements is shown, in accordance with embodiments of the present invention. Initially, a block-level element 1140 is indicated and provided with highlighting 1150, thus, it is visually distinct from non-indicated block-level elements 1130. However, there is only one content pane 1120 depicted. Accordingly, no highlighting on the content pane 1120 is required. Further, the small size of the display area 1100 (e.g., presented on a mobile device) limits the amount of information that may be displayed. Accordingly, the adaptive template can utilize the form factors from the display area 1100 to determine the number and type of content panes to establish on the page layout 1160. In this instance, only the content pane 1120 is established as additional content panes (e.g., for advertisements, images, additional search results, or other content) would compact the visible content into an illegible display. Accordingly, the adaptive templates ensure that the format of the page layout, when rendered, is efficiently readable and navigable by a user.

With reference to FIGS. 9 and 11, the size of the display area 1100 may be the result of a resize-the-display-area command. This command may be provided by a user when reducing the size of a window associated with the display area 1100, as more fully discussed above. For instance, the display area 1100 may be reduced from the display area 900 of FIG. 9. Accordingly, the page layout 910 is reconfigured to the page layout 1160. In particular, because the height of the display area 900 is reduced, the content pane 915 that is configured to accept the images 920, and the content pane 925 that is configured to accept the advertisements 930, are removed. Also, because the width of the display area 900 is reduced, the column-style content pane 950 that accepts block-level elements is removed, leaving a single content pane for receiving block-level elements. Thus, the page layout 1160 is adapted for the size of the display area 1100 such that a user is presented with an easily readable and navigable set of content, which is not cluttered or overly minimized.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computerized method for focusing a user's attention to one of a plurality of search results presented within a display area divided into one or more content panes, the method comprising:

providing search results, wherein the search results are generated according to a query;

accessing form factors that describe attributes of the display area provided to present the search results;

dynamically converting the search results into respective block-level elements, wherein the block-level elements reveal content extracted from the received search results, respectively, and wherein converting comprises removing formatting rules imposed by original documents associated with the search results;

selecting at least one adaptive template according to the accessed form factors, wherein the at least one adaptive template is employed to provide a page layout via an application process comprising:
 (a) formatting the converted content of the block-level elements as a function of the at least one adaptive template; and
 (b) specifying the page layout comprising one or more content panes as a function of the at least one adaptive template;

populating the one or more content panes with the block-level elements;

recognizing that a search result of the search results is selected;

identifying a block-level element associated with the selected search result;

identifying a content pane of the one or more content panes that is populated with the identified block-level element; and visually distinguishing the identified block-level element such that, when rendered on a graphical user interface (GUI), the identified block-level element is appears distinct from a remainder of the block-level elements populated within the identified content pane.

2. The method of claim 1, wherein visually distinguishing comprises highlighting the identified content pane such that the identified content pane is visually distinct from a remainder of the content panes comprising the one or more content panes when rendered on the GUI.

3. The method of claim 1, further comprising determining a format for highlighting the identified block-level element using the adaptive template.

4. The method of claim 1, further comprising dividing the display area into the one or more content panes according to the attributes of the display area.

5. The method of claim 3, further comprising determining a format for highlighting the identified content pane by referencing the adaptive template.

6. The method of claim 5, further comprising rendering the identified block-level element and the identified content pane on the GUI according to the determined format for highlighting.

* * * * *